United States Patent
Totani

(10) Patent No.: US 11,072,476 B2
(45) Date of Patent: Jul. 27, 2021

(54) SPOUT MOUNTING METHOD

(71) Applicant: Totani Corporation, Kyoto (JP)

(72) Inventor: Mikio Totani, Kyoto (JP)

(73) Assignee: TOTANI CORPORATION, Kyoto (JP)

(*) Notice: Subject to any disclaimer, the term of this patent is extended or adjusted under 35 U.S.C. 154(b) by 204 days.

(21) Appl. No.: 16/372,516

(22) Filed: Apr. 2, 2019

(65) Prior Publication Data

US 2019/0233190 A1    Aug. 1, 2019

Related U.S. Application Data

(63) Continuation of application No. 15/194,644, filed on Jun. 28, 2016, now abandoned.

(30) Foreign Application Priority Data

Jul. 6, 2015  (JP) .................................. 2015-134870

(51) Int. Cl.
*B65D 75/58*    (2006.01)
*B29C 65/00*    (2006.01)
(Continued)

(52) U.S. Cl.
CPC .......... *B65D 75/5872* (2013.01); *B29C 65/02* (2013.01); *B29C 65/7457* (2013.01);
(Continued)

(58) Field of Classification Search
CPC ..... B65D 75/5877; B31B 50/14; B31B 50/81; B31B 50/84; B31B 70/844; B29C 65/7891; B29C 66/4742
(Continued)

(56) References Cited

U.S. PATENT DOCUMENTS 3,244,576 A * 4/1966 Swartz ............... B29K 2827/18
                                                        156/513
3,490,979 A * 1/1970 Calvert .................. B29C 65/18
                                                        156/366
(Continued)

FOREIGN PATENT DOCUMENTS

EP           0043425        1/1982
JP           S55163130      12/1980
(Continued)

OTHER PUBLICATIONS

Chinese Search Report in counterpart Chinese patent application No. 201610523685.7, dated Mar. 28, 2018.
(Continued)

*Primary Examiner* — Robert F Long
*Assistant Examiner* — Xavier A Madison
(74) *Attorney, Agent, or Firm* — Kirschstein, Israel, Schiffmiller & Pieroni, P.C.

(57) ABSTRACT

A spout is mounted on a plastic film being longitudinally and intermittently fed. The plastic film is punched by a punch blade to form an aperture. A carriage is moved for a distance corresponding to a space between the punch blade and a seal head and between a punch receiver and a seal receiver. The spout is inserted into the aperture. The spout and the plastic film are heat sealed with each other by the seal head.

9 Claims, 3 Drawing Sheets

(51) Int. Cl.
  *B29C 65/74* (2006.01)
  *B29C 65/78* (2006.01)
  *B31B 50/81* (2017.01)
  *B31B 50/84* (2017.01)
  *B31B 50/14* (2017.01)
  *B29C 65/02* (2006.01)
  *B65D 33/16* (2006.01)
  *B29C 65/08* (2006.01)
  *B29C 65/16* (2006.01)
  *B29C 65/36* (2006.01)
  *B29C 65/04* (2006.01)
  *B31B 70/14* (2017.01)
  *B31B 70/64* (2017.01)
  *B31B 70/84* (2017.01)

(52) U.S. Cl.
  CPC ...... *B29C 65/7864* (2013.01); *B29C 65/7876* (2013.01); *B29C 65/7891* (2013.01); *B29C 66/112* (2013.01); *B29C 66/131* (2013.01); *B29C 66/47421* (2013.01); *B29C 66/83221* (2013.01); *B29C 66/851* (2013.01); *B31B 50/14* (2017.08); *B31B 50/81* (2017.08); *B31B 50/84* (2017.08); *B65D 33/16* (2013.01); *B29C 65/04* (2013.01); *B29C 65/08* (2013.01); *B29C 65/16* (2013.01); *B29C 65/36* (2013.01); *B31B 70/142* (2017.08); *B31B 70/642* (2017.08); *B31B 70/844* (2017.08)

(58) Field of Classification Search
  USPC .......................................................... 493/213
  See application file for complete search history.

(56) References Cited

U.S. PATENT DOCUMENTS

| | | | | |
|---|---|---|---|---|
| 3,868,891 | A * | 3/1975 | Parish | B29C 66/131 493/194 |
| 4,341,522 | A * | 7/1982 | Gaubert | B31B 70/00 493/213 |
| 4,710,157 | A * | 12/1987 | Posey | B29C 53/04 493/213 |
| 5,983,599 | A * | 11/1999 | Krueger | B31B 50/00 493/213 |
| 6,027,438 | A * | 2/2000 | Frazier | B65B 61/186 493/196 |
| 6,148,710 | A * | 11/2000 | Pottorff | B26D 3/12 83/682 |
| 6,662,524 | B2 | 12/2003 | Annehed | |
| 7,117,777 | B1 * | 10/2006 | Wilkes | B21D 43/028 83/320 |

FOREIGN PATENT DOCUMENTS

| | | |
|---|---|---|
| JP | 2006305801 | 11/2006 |
| JP | 2008132634 | 6/2008 |
| JP | 2013-159093 | 8/2013 |
| KR | 20030054724 | 7/2003 |
| WO | 2008096392 | 8/2008 |

OTHER PUBLICATIONS

European Search Report in counterpart Eueopean patent application No. 16177921.0, dated Nov. 30, 2016.

* cited by examiner

SPOUT MOUNTING METHOD

TECHNICAL FIELD

The invention relates to an apparatus for mounting a spout on a plastic film fed longitudinally thereof and intermittently.

BACKGROUND

Each of Japanese Patent Publication No. 5,179,386 and Japanese Laid-Open Patent Publication No. 159,093 of 2013 discloses a machine for making plastic bags successively, the plastic bag including a spout.

In the machine, a plastic film is fed longitudinally thereof and intermittently for a length. The machine includes an apparatus comprising a punch blade, a spout inserting device and a seal head, which are spaced from each other at a distance corresponding to the feed length in the feed direction of the plastic film. The plastic film is punched by the punch blade when the plastic film is stopped temporarily whenever being fed intermittently. An aperture is therefore formed in the plastic film. The plastic film is then fed again and intermittently so that the aperture reaches a position at which the spout inserting device and the seal head are disposed. A spout is then inserted into the aperture by the spout inserting device. The spout and the plastic film are sealed with each other by the seal head, to mount the spout on the plastic film. The machine then makes the plastic bag by using the plastic film. The plastic bag can therefore be provided with the spout.

The term "sealed" here means "welded" including "heat sealed", "ultrasonic sealed", "laser sealed", "high frequency sealed" and "electromagnetic induction sealed". It should be noted that in the machine of the publication, the spout and the plastic film are heat sealed with each other.

In this case, the apparatus makes the aperture formed, makes the spout inserted and makes the spout and the plastic film sealed concurrently at different positions, to be efficient and high in speed. However, on the other side of the coin, the plastic film may be stretched by tension when being fed intermittently. The plastic film may meander or advance obliquely by accident. Accordingly, the aperture and the spout inserting device are not always consistent with each other exactly when the aperture reaches the position of the spout inserting device and the seal head. As a result, the spout may not be inserted into the aperture reliably, leading to defective goods. The spout and the seal head are not always consistent with each other exactly. As a result, the spout and the plastic film may not be sealed adequately, leading to defective goods. In this connection, it should be understood that the plastic bag is high in unit price when being provided with the spout. It is therefore desired to minimize the percent of defectiveness of the plastic bags.

The apparatus may additionally involve a CCD camera or a sensor to detect the aperture and the spout so that the spout inserting device and the seal head can be moved finely for adjustment of position to obtain the consistency between the aperture and the spout inserting device and between the spout and the seal head. However, in this case, the apparatus must be complicated in structure and high in cost.

It is therefore an object of the invention to provide an improved apparatus for mounting a spout on a plastic film fed longitudinally thereof and intermittently to minimize the percent of defectiveness, the apparatus being simple in structure and low in cost.

SUMMARY OF THE INVENTION

According to the invention, the apparatus includes a punch blade and a punch receiver disposed on opposite sides of the plastic film and opposed to each other in a direction normal to the plastic film. The punch blade and the punch receiver are carried by a carriage. The apparatus further includes a seal head and a seal receiver disposed on the opposite sides of the plastic film and opposed to each other in the direction normal to the plastic film, the seal head and the seal receiver being spaced from the punch blade and the punch receiver in a direction parallel to the plastic film. The seal head and the seal receiver are also carried by the carriage. The apparatus further includes a punch blade drive by which the punch blade is moved toward the plastic film and the punch receiver when the plastic film is stopped temporarily whenever being fed intermittently so that the plastic film is sandwiched between the punch blade and the punch receiver to be punched by the punch blade. An aperture is therefore formed in the plastic film. The apparatus further includes a carriage drive by which the carriage is moved for a distance corresponding to a space between the punch blade and the seal head and between the punch receiver and the seal receiver so that the seal head and the seal receiver are disposed at a position at which the punch blade and the punch receiver have been disposed. The apparatus further includes a spout inserting device by which a spout is inserted into the aperture. The apparatus further includes a seal head drive by which the seal head is moved toward the spout, the plastic film and the seal receiver after the spout is inserted so that the spout and the plastic film are sandwiched between the seal head and the seal receiver to be sealed with each other by the seal head. The apparatus therefore makes the aperture formed, makes the spout inserted and makes the spout and the plastic film sealed, respectively at the position.

In a preferred embodiment, the spout inserting device includes a spout feeder by which the spout is supplied to the seal receiver. The spout inserting device further includes a seal receiver drive by which the seal receiver is moved toward the plastic film after the carriage is moved so that the spout is inserted into the aperture.

The seal head and the seal receiver are spaced from the punch blade and the punch receiver widthwise of the plastic film. The carriage is moved widthwise of the plastic film after the aperture is formed.

The seal head and the seal receiver may be spaced from the punch blade and the punch receiver longitudinally of the plastic film. The carriage is moved longitudinally of the plastic film after the aperture is formed.

BEST MODE TO CARRY OUT THE INVENTION

Figure 1:
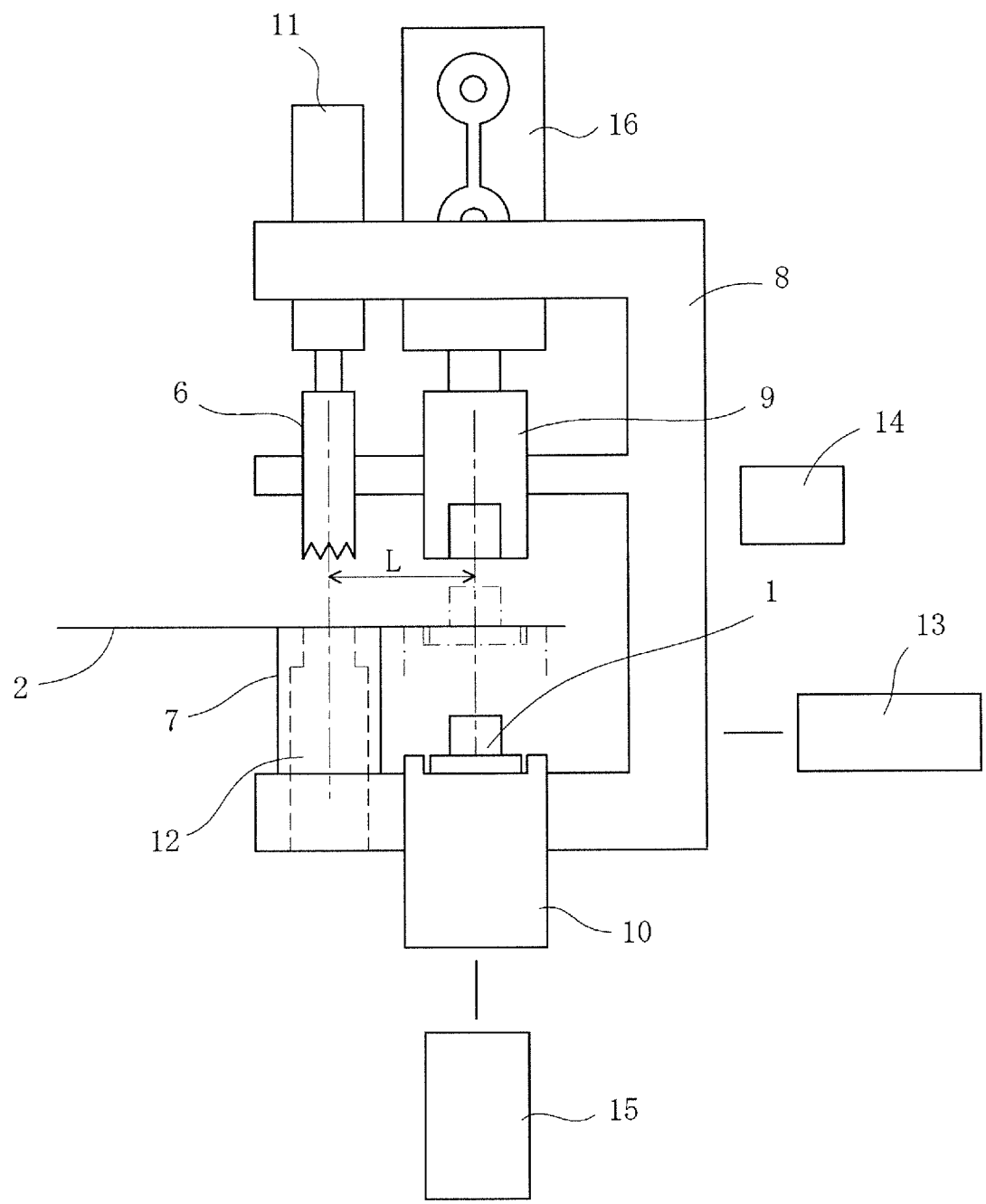
FIG. 1 is an elevational view of a preferred embodiment of the invention.

Turning now to the drawings, FIG. 1 illustrates an apparatus according to the invention. The apparatus is incorporated into a machine for making plastic bags successively, to mount a spout 1 on a plastic film 2 fed longitudinally thereof and intermittently, as in the case of the apparatus of each of Japanese Patent Publication No. 5,179,386 and Japanese Laid-Open Patent Publication No. 159,093 of 2013. The machine makes the plastic bag by using the plastic film 2. The plastic bag can therefore be provided with the spout 1.

Figure 2A:
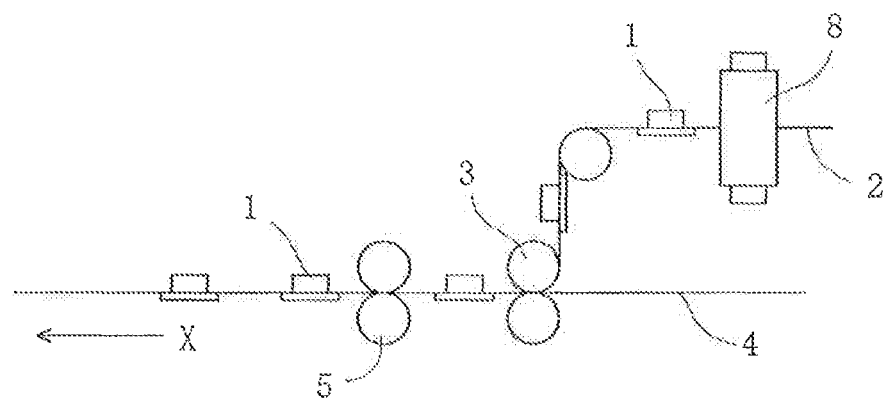
FIG. 2A is a side view of the machine of FIG. 1.

In the machine, the plastic film 2 is directed to guide rollers 3 while another plastic film 4 is directed to the guide rollers 3 so that the plastic films 2 and 4 can be superposed with each other, as shown in FIG. 2A. The machine includes a feed device comprising feed rollers 5, the plastic films 2 and 4 being directed to the feed rollers 5. The feed rollers 5 are rotated by a drive motor so that the plastic films 2 and 4 can be fed longitudinally thereof and intermittently for a length. The plastic films 2 and 4 are therefore fed in a direction X which is longitudinal of the plastic films 2 and 4 (FIG. 2A).

The apparatus includes a punch blade 6 and a punch receiver 7 disposed on opposite sides of the plastic film 2 and opposed to each other in a direction normal to the plastic film 2. The punch blade 6 and the punch receiver 7 are carried by a carriage 8. For example, the plastic films 2 and 4 extend horizontally, as also in the case of the apparatus of the publications. The punch blade 6 is disposed on the upper side of the plastic film 2 while the punch receiver 7 is disposed on the lower side of the plastic film 2. The punch blade 6 and the punch receiver 7 are carried by the carriage 8 to be opposed to each other. The carriage 8 has a sectional shape of channel. The punch blade 6 comprises a saw-toothed edge.

The apparatus further includes a seal head 9 and a seal receiver 10 disposed on the opposite sides of the plastic film 2 and opposed to each other in the direction normal to the plastic film 2, the seal head 9 and the seal receiver 10 being spaced from the punch blade 6 and the punch receiver 7 in a direction parallel to the plastic film 2. The seal head 9 and the seal receiver 10 are also carried by the carriage 8. In the embodiment, the seal head 9 is disposed on the upper side of the plastic film 2 while the seal receiver 10 is disposed on the lower side of the plastic film 2. The seal head 9 and the seal receiver 10 are spaced from the punch blade 6 and the punch receiver 7 widthwise of the plastic film 2. The seal head 9 and the seal receiver 10 are carried by the carriage 8 to be opposed to each other. The seal head 9 comprises a heat seal head, an ultrasonic seal head, a laser seal head, a high frequency seal head or an electromagnetic induction seal head.

The apparatus further includes a punch blade drive 11 by which the punch blade 6 is moved toward the plastic film 2 and the punch receiver 7 when the plastic film 2 is stopped temporarily whenever being fed intermittently. For example, the punch blade drive 11 comprises an air cylinder or a servomotor attached to the carriage 8. The punch blade 6 is connected to and supported by the air cylinder or the servomotor. The punch blade 6 is moved downward and toward the plastic film 2 and the punch receiver 7 by the air cylinder or the servomotor so that the plastic film 2 is sandwiched between the punch blade 6 and the punch receiver 7 to be punched by the punch blade 6. An aperture is therefore formed in the plastic film 2. The punch blade 6 is then moved upwardly and returned to the original position.

In the embodiment, the punch receiver 7 is hollow to have a bore 12. The plastic film 2 is therefore punched by the punch blade 6 to generate a waste which is discharged through the bore 12.

Figure 2B:
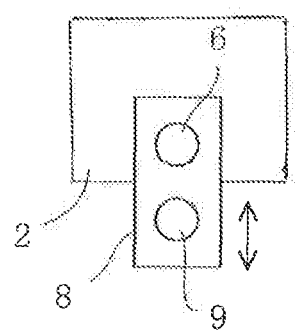
FIG. 2B is a plan view of the plastic film and the carriage of FIG. 2A.
Figure 2C:
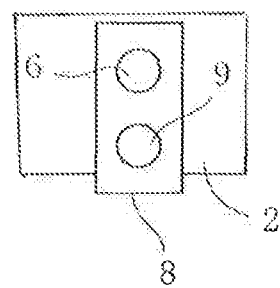
FIG. 2C is a plan view of the carriage of FIG. 2B after being moved.

The apparatus further includes a carriage drive 13 by which the carriage 8 is moved (FIG. 2B). For example, the carriage drive 13 comprises an air cylinder or a servomotor connected to the carriage 8. The carriage 8 is moved by the air cylinder or the servomotor for a distance L corresponding to a space between the punch blade 6 and the seal head 9 and between the punch receiver 7 and the seal receiver 10 so that the seal head 9 and the seal receiver 10 are disposed at a position at which the punch blade 6 and the punch receiver 7 have been disposed (FIG. 2C). In the embodiment, the carriage 8 is moved widthwise of the plastic film 2 after the aperture is formed. FIG. 1 illustrates the aperture formed and the carriage 8 moved.

It should be understood that the seal head 9 and the seal receiver 10 are positioned outwardly of the plastic film 2 widthwise thereof in the state of FIG. 2B. Accordingly, strictly speaking, the seal head 9 and the seal receiver 10 are disposed not on the upper and lower sides of the plastic film 2 but on the upper and lower sides of an extension thereof. However, in any case, it is true that the seal head 9 and the seal receiver 10 are disposed on the upper and lower sides of the plastic film 2 in the direction normal to the plastic film 2 when viewing widthwise of the plastic film 2. The seal head 9 and the seal receiver 10 are then disposed not on the upper and lower sides of the extension but on the upper and lower sides of the plastic film 2 in the state of FIG. 2C.

The apparatus further includes a spout inserting device by which a spout 1 is inserted into the aperture. In the embodiment, the spout inserting device includes a spout feeder 14 by which the spout 1 is supplied to and supported by the seal receiver 10 when the aperture is formed in the plastic film 2. For example, the spout feeder 14 comprises a robot by which the spout 1 is supplied. The spout inserting device further includes a seal receiver drive 15 by which the seal receiver 10 is moved toward the plastic film 2 after the aperture is formed and the carriage 8 is moved. For example, the seal receiver drive 15 comprises an air cylinder or a servomotor. The seal receiver 10 is supported by the carriage 8 for movement. The air cylinder or the servomotor is attached to and supported by the carriage 8 and connected to the seal receiver 10 so that the seal receiver 10 can be moved upward and toward the plastic film 2 by the air cylinder or the servomotor. The seal receiver 10 is moved toward the plastic film 2 at the position at which the punch blade 6 and the punch receiver 7 have been positioned and the aperture has been formed. The spout 1 is therefore inserted into the aperture.

The apparatus further includes a seal head drive 16 by which the seal head 9 is moved. For example, the seal head drive 16 comprises a servomotor attached to the carriage 8. The seal head 9 is connected to the servomotor to be supported by the carriage 8 and the servomotor. The seal head 9 is moved downward and toward the spout 1, the plastic film 2 and the seal receiver 10 by the servomotor so that the spout 1 and the plastic film 2 are sandwiched between the seal head 9 and the seal receiver 10 to be sealed with each other by the seal head 9. The apparatus can therefore mount the spout 1 on the plastic film 2. The seal head 9 is then moved upward and returned to the original position. The seal receiver 10 is moved downward and returned to the original position.

The term "sealed" here means "welded", in which for example, the spout 1 and the plastic film 2 are heat sealed or ultrasonic sealed with each other. The spout 1 and the plastic film 2 may be laser sealed, high frequency sealed or electromagnetic induction sealed with each other.

Subsequently, the carriage 8 is moved and returned to the original position. The steps are then performed alternately and repeatedly whenever the plastic film 2 is fed intermittently.

The plastic films 2 and 4 are directed to the feed rollers 5 after mounting the spout 1 to be fed intermittently by the feed rollers 5. In this connection, it is preferable to make circumferential grooves formed in the feed rollers 5 so that the spout 1 can pass through the grooves. The feed rollers 5 may be divided axially thereof so that the spout 1 can pass between the divided rollers.

In addition, the plastic films 2 and 4 are then directed to a longitudinal seal device and a cross seal device to be sealed with each other longitudinally and widthwise thereof, as in the case of the common machine. The plastic films 2 and 4 are then directed to a cross cutter to be cut by the cross cutter, making the plastic bag of the plastic films 2 and 4. The plastic bag can therefore be provided with the spout 1.

In the apparatus, the aperture is formed in the plastic film 2, the carriage 8 being then moved for the distance L corresponding to the space between the punch blade 6 and seal head 9 and between the punch receiver 7 and the seal receiver 10 so that the seal head 9 and the seal receiver 10 are disposed at the position at which the punch blade 6 and the punch receiver 7 have been disposed. In addition, the spout 1 is inserted into the aperture, the spout 1 and the plastic film 2 being then sealed with each other by the seal head 9. The apparatus therefore makes the aperture formed, makes the spout 1 inserted and makes the spout 1 and the plastic film 2 sealed, respectively at the position.

Accordingly, the seal head 9, the aperture and the seal receiver 10 can be consistent with each other exactly when the spout 1 is inserted and the spout 1 and the plastic film 2 are then sealed. As a result, the spout 1 can be inserted into the aperture reliably. The spout 1 and the plastic film 2 can be sealed with each other adequately. The apparatus can therefore minimize the percent of defectiveness of the plastic bags. The apparatus is still operable even if the plastic film 2 will meander or advance obliquely by accident.

The apparatus does not have to involve a CCD camera or a sensor to detect the aperture and the spout 1 and to make the spout inserting device and the seal head 9 moved finely for adjustment of position, to be simple in structure and low in cost.

Figure 3A:
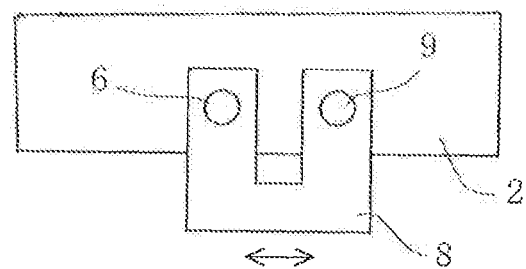
FIG. 3A is a plan view of another embodiment and FIG. 3B is a plan view of another embodiment.

It is not always necessary that the seal head 9 and the seal receiver 10 are spaced from the punch blade 6 and the punch receiver 7 widthwise of the plastic film 2, as in the case of the embodiment. The seal head 9 and the seal receiver 10 may be spaced from the punch blade 6 and the punch receiver 7 longitudinally of the plastic film 2 and supported by the carriage 8, as shown in FIG. 3A. In this case, the carriage 8 is moved longitudinally of the plastic film 2 after the aperture is formed so that the seal head 9 and the seal receiver 10 are disposed at the position at which the punch blade 6 and the punch receiver 7 have been disposed.

Figure 3B:
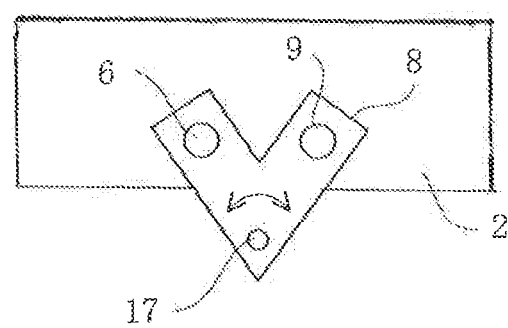

The carriage 8 may be moved longitudinally of the plastic film 2 by translation (FIG. 3A). The carriage 8 may be swung and moved about an axis 17 (FIG. 3B).

What is claimed is:

1. A method of mounting a spout on a plastic film, the method comprising:
   feeding, and then stopping, the plastic film between a punch blade and a punch receiver that are disposed in mutual alignment with each other at a first position at opposite sides of the plastic film;
   mounting a seal head and a seal receiver in mutual alignment with each other at a second position at opposite sides of the plastic film, the second position being spaced apart from the first position by a predetermined distance;
   moving at least one of the punch blade and the punch receiver relative to, and toward, each other to punch an aperture in the plastic film at the first position, while the plastic film is stopped;
   feeding the spout to the seal receiver;
   jointly moving the seal head, the seal receiver and the spout through said predetermined distance to the first position overlying the aperture, while the plastic film is stopped;
   moving the seal receiver and the spout toward the plastic film to insert the spout into the aperture at the first position, while the plastic film is stopped; and
   moving the seal head toward the plastic film to seal the inserted spout in the aperture at the first position, while the plastic film is stopped.

2. The method of claim 1, and configuring the punch blade with a leading end having a toothed edge.

3. The method of claim 1, and configuring the punch receiver with a hollow interior, and removing waste created when the aperture is punched through the hollow interior.

4. The method of claim 1, wherein the punch blade, the punch receiver, the seal head, and the seal receiver are all commonly mounted on a carriage, and wherein the joint movement of the seal head, the seal receiver and the spout through said predetermined distance to the first position is performed over a linear path by a carriage drive.

5. The method of claim 4, and configuring the plastic film to extend along mutually orthogonal, longitudinal and transverse directions, and wherein the linear path extends along one of said directions.

6. The method of claim 1, wherein the punch blade, the punch receiver, the seal head, and the seal receiver are all commonly mounted on a carriage, and wherein the joint movement of the seal head, the seal receiver and the spout through said predetermined distance to the first position is performed over an arcuate path by a carriage drive.

7. The method of claim 1, wherein the movement of the punch blade, the movement of the seal receiver, and the movement of the seal head are performed by individual drives.

8. The method of claim 1, wherein the feeding and stopping of the plastic film are alternatingly and intermittently performed.

9. The method of claim 1, and forwarding the plastic film away from the first position after the spout has been sealed in the aperture.

* * * * *